United States Patent Office 3,714,110
Patented Jan. 30, 1973

3,714,110
OIL EXTENDED POLYURETHANES BASED ON HYDROXY TERMINATED DIENE POLYMERS
Joseph A. Verdol, Dolton, Patrick W. Ryan, Chicago Heights, and Donald J. Carrow, Riverdale, Ill., assignors to Atlantic Richfield Company
No Drawing. Continuation of application Ser. No. 751,691, Aug. 2, 1968, which is a continuation of application Ser. No. 465,161, June 18, 1965, both now abandoned. This application Jan. 22, 1971, Ser. No. 109,059
Int. Cl. C08g 51/52
U.S. Cl. 260—33.6 AQ                    23 Claims

ABSTRACT OF THE DISCLOSURE

Oil-extended, solid urethane elastomers are made from polyisocyanates and polyhydroxy diene polymers, preferably having at least 2.1 predominantly primary, allylic, terminal hydroxyl groups per molecule, and essentially hydrocarbon extender agents. The urethane elastomer is formed in the presence of the extender agent and the polyhydroxy polymer may be a diene homopolymer, for instance, of butadiene, or a copolymer of the diene and an alpha-mono-olefinic monomer of 2 to 12 carbon atoms. The polyhydroxy polymer is of relatively low molecular weight and preferably has greater than 50% of its unsaturation in the main hydrocarbon chain, for instance, about 50 to 65% trans-1,4-unsaturation and about 15 to 25% cis-1,4-unsaturation. The elastomers can be mixed with various fillers including carbon black and silica and may contain urea linkages. Preferred extending agents are mineral oils having a viscosity of about 100 to 600 SSU at 100° F.

---

This application is a continuation of application Ser. No. 751,691, filed Aug. 2, 1968, now abandoned, which in turn is a continuation of application Ser. No. 465,161, filed June 18, 1965, now abandoned.

This invention relates to general purpose urethane resin polymers and in particular is concerned with novel oil-extended urethane resins. The resins are liquid castable urethane elastomers derived from hydroxyl-terminated diene homopolymers and copolymers. The invention provides very low-cost synthetic resin materials useful as liquid castable elastomers, injection moldable elastomers, millable elastomers, foams, adhesives, caulks, sealants, potting and encapsulating compositions and related urethane materials of the type which have become of great commercial importance within the past decade and which are projected to be of even further commercial importance in the near future.

A variety of liquid castable urethane elastomer systems are available commercially. These systems are based upon liquid polymers which can be reacted with polyisocyanate materials. Sometimes amino-containing compounds are employed with the other reactants to give urea-urethane polymers. Presently available urethane elastomers or urea-urethane elastomers, usually produced from polyethers and polyesters, are ordinarily characterized by their high abrasion resistance, good solvent resistance and outstanding tensile properties. These desirable properties are usually attributed, at least in part, to the strong secondary valance forces or intermolecular valence forces existing in the backbone of the elastomer. However, because of their relatively high cost, present day urethanes are classified as "specialty rubbers," rather than "general purpose rubbers." As a result, liquid castable urethane systems presently produced are higher in cost than general purpose rubbers and are, therefore, employed only where the high performance needs outweigh the cost aspects of the situation.

Many of the available general purpose rubbers, whether natural or synthetic, derive their lower price from their ability to be extended with oils which are usually essentially hydrocarbon materials of lubricant or heavier grades. Further, any diminution of the rubber properties can often be made up for by inclusion in the rubber-oil mixture of carbon-black, silica and other fillers. Since both the oils and the fillers are much lower in cost, a general purpose rubber is considerably less expensive, on a pound-for-pound basis, than the latex from which it is prepared.

The concept of general purpose elastomers which are liquid castable has been investigated by rubber chemists for many years. However, known urethane resins have not successfully been oil extended, since, when diluted with rubber extender oil, the oil "bleeds" from the material and destroys the physical properties of the elastomer. Similarly, urethane resins extended and/or reinforced with significant amounts of carbon black, silica, and other conventional reactive and inert fillers, e.g. metal oxides, clays or pulverized reclaimed rubber have not previously been commercially known. Thus the price of urethane products has remained high.

The present invention provides urethane elastomers of much greater commercial utility and introduces commercially feasible liquid castable urethane, including urea-urethane, elastomers which can be classified as "general purpose elastomers."

The use of a general purpose liquid castable elastomer offers many advantages over the solid general purpose elastomers presently produced, e.g., solid elastomers such as GR-S, cis-polybutadiene, cis-polyisoprene (natural and synthetic), solution styrene-butadiene ethylene-propylene terpolymer, butyl rubber and the like. The principal advantage of a general purpose liquid castable elastomer is that it provides a pronounced economic advantage in the fabrication of a wide variety of rubber goods by lowering labor costs and eliminating high pressure mixers, mills, molds and other costly equipment as well as multiple fabrication steps. For example, liquid castable elastomer compositions are easily poured or forced into molds of any desired shape or form and subsequently cured at room temperature or elevated temperature with the requirement of simple equipment and little or no high pressure for the achievement of complete cure.

In the present invention it has been discovered that general purpose, liquid castable elastomers of very low cost and possessing many desirable physical properties can be prepared from blends of essentially hydrocarbon oils with hydroxyl-terminated diene homopolymers and copolymers which are subsequently cured and/or chain-extended with polyisocyanates. These extended urethane resins may often contain about 1–500% or more essentially hydrocarbon oil, based on the weight of the diene polymer. The ability to dilute the already liquid hydroxyl-terminated diene homopolymers and copolymers with oil provides a great economic advantage by lowering raw material costs, and concurrently provides other features not found in conventional urethane systems, such as improvements in pot life and hydrolytic stability, while at the same time providing materials which can be cured with isocyanates, and, if desired, sulfur and peroxide curing systems.

A further improvement afforded by the present castable urethane systems is that much greater flexibility is provided with regard to the physical properties of the final elastomeric product than is provided with conventional urethane systems based on hydroxyl-terminated polyethers or polyesters. For example, by varying the amount of extender oil used in conjunction with the hydroxyl-terminated diene homopolymers and copolymers and the concentration and types of fillers used, a wide variety of liquid castable products may be obtained which differ in shore hardness values, tensile strength, tear strength, elongation, modulus, resistance to oxidation, and hydrolytic stability. Furthermore, the oil-extendible urethane systems of the present invention show the further advantage of having a high degree of fluidity which may be varied by varying the viscosity of the hydroxyl-terminated diene homopolymer or copolymer and the concentration of extender oil used.

Conventional liquid castable urethane systems are limited to those in which the starting polyesters or polyethers are suitably thin. Too viscous, or even solid polyethers and polyesters cannot effectively be diluted with or dissolved in extender oil. They, therefore, must be mixed with the comonomer and processed or cast at elevated temperature. Frequently, this elevated temperature shortens the liquid pot life and makes the casting of large objects very difficult. The uncured materials of the present invention may be mobile liquids at ambient temperature and, accordingly, are easier to process than urethane systems based solely on polyesters or polyethers. Furthermore, the pot life or liquid process time of the products of the present invention may be varied and more easily controlled.

Oil extension also provides a means of lowering toxicity of isocyanates, since the systems which are oil diluted will have a lower isocyanate vapor pressure prior to curing. To reduce toxicity of two component caulks, sealants, adhesives, and related systems, it is possible to employ a portion of the oil to dilute the isocyanate component prior to mixing with the polydiene resins.

A further advantage of the extended urethane elastomers of the present invention, as previously stated, is that the product can be cured via conventional sulfur cures or peroxide cures as well as by the reactions which take place between the hydroxyl groups of the hydroxyl-terminated diene homopolymers and copolymers and the diisocyanates or other multi-functional isocyanates. In fact, the oil-extended urethane systems of the present invention offer a further significant feature which is again not found in present day urethane elastomers based on polyethers or polyesters; namely, the ability to be processed with conventional general purpose rubbers such as GR–S, cis-polybutadiene, solution polybutadienestyrene rubber, cis-polyisoprene (both natural and synthetic), ethylene-propylene polymers, butyl and other general purpose rubbers. Since many of the conventional rubbers mentioned above are also oil extendable, the urethane products of the present invention provide a new and unique vehicle for incorporating some of the desirable features of urethane elastomers in general purpose rubber elastomers at low cost. Thus, the oil-extended urethane elastomers of the present invention can be co-milled or mixed in other ways with the general purpose rubbers described above and the blends subsequently may be co-cured via the isocyanate reactions as well as sulfur or peroxide reactions. The final products will, therefore, display the outstanding qualities characteristic of each of the general purpose elastomers, while concurrently possessing desirable qualities characteristic of urethane elastomers, the latter qualities being, among others, improvement in abrasion resistance, and oil resistance, owing to the presence of urethane, urea, biuret, allophonate and other linkages which are formed via isocyanate reactions with the hydroxyl groups, amine groups or other functional groups which are utilized in producing urethane and urea-urethane elastomers. In systems of this type, for example, the sulfur or peroxide cures or even energy generated during milling may serve to graft or attach the hydroxyl-terminated diene homopolymers or copolymers to the backbone of the general purpose rubber, e.g. GR–S, cis-polybutadiene, cis-polyisoprene, ethylene-propylene copolymer, etc., while the isocyanate reactions serve to interlink the hydroxyl groups of the grafted liquid diene homopolymer or copolymer via urethane, urea, biuret, and allophonate linkages. The final result, therefore, is a polymer network system structure combining the outstanding features of both types of elastomers. The ability to combine three desirable characteristics—urethane structure, oil extension and compatibility with general purpose rubbers, of course, provides properties which have hitherto been difficult to achieve or incorporate into present day general purpose elastomers.

Another advantage of the present invention is that it allows incorporating oil-extendible urethane systems into conventional urethane systems. That is, the oil-extended urehane systems based upon hydroxyl-terminated diene homopolymers and copolymers may be co-reacted or co-blended with varying amounts of urethane products based upon hydroxyl-terminated polyethers or polyesters. Such combinations of extended urethane resins and conventional urethane resins provide many advantages. The final product, having combined polyether and polydiene (or polydiene-copolymer) backbones shows a greater hydrolytic stability than pure polyether urethane, that is, it has improved resistance to hydrolysis in aqueous systems at all pH ranges. An even more pronounced improvement in hydrolytic stability of polyester urethanes results when a urethane system derived from hydroxy-terminated polydiene is admixed or co-reacted with a polyester system. Such products contain, in addition to polyester structures, backbone structures derived from the hydroxyl-terminated diene homopolymers and copolymers. These mixed urethane systems incorporating the backbone provided by hydroxyl-terminated diene homopolymers and copolymers can also be oil extended to varying degrees, depending upon the amount of hydroxyl-terminated diene homopolymers and copolymers which are co-reacted or co-blended with conventional polyether or polyester urethanes.

The novel polymers of this invention comprise, for instance at least about 25 weight percent, of the residues of a diene polyhydroxy intermediate polymer generally having at least about 1.8 predominantly primary, allylic, terminal, i.e., attached to a terminal carbon atom, hydroxyl groups per polymer molecule on the average. Most advantageously, the intermediate polymer has greater than two average terminal hydroxyl groups, e.g., at least 2.1 to, say, 2.6 or even 3 or more. Also, two terminal hydroxyls are generally separated by a long carbon-carbon chain. The polydiene which appears as a residue in the composition of this invention differs from the homopolymers and copolymers of butadiene and related dienes which are commercially available as GR–S rubber, etc. The intermediate polymer of this invention may have a viscosity at 30° C. of about 5–20,000 poises, preferably about 15 to 5000 poises. Often the intermediate polymers, when a homopolymer, is obtained in a viscosity range of about 20 to 300 or 500 poises at 30° C. Preferred homopolymers have a viscosity of about 35 to 60 poises or about 190 to 260 poises at 30° C. Thus, the intermediate polymers are essentially liquids, including semi-solids flowable under moderate pressure, at ambient temperatures or at temperatures in the range of −100° F. to 400° F., which enables them to be readily mixed with urethane or urea-urethane producinng condensing or cross-linking agents and also with the oil extending agent and, still in the liquid form, be cast into molds or otherwise shaped and cured. The hydroxyl-containing intermediate diene polymers used in the present invention will have number average molecular weights in the range of about 400 to about 25,000 as determined by cryoscopic, ebullioscopic or osmometric methods. The preferred hydroxyl-containing diene homopolymers and copolymers will be in the molecular weight range of about 900 to 10,000. In contrast, conventional diene polymers such as GR–S rubber are extremely high in molecular weight, e.g., in the range of several hundred thousand and are, therefore, rubber-like materials which are not useful as the intermediate polymer in the preparation of the urethane rubbers of the present invention. The latter diene polymers are too high in molecular weight to be worked at ambient temperatures and are not readily susceptible to reaction with diisocyanates, etc.

The diene polymers which are used in this invention have primary hydroxyl groups which are allylic in configuration, thereby being of a more reactive nature in the condensation polymerization reaction and apparently providing an improved stability in the final elastomer product. The preferred diene partial polymer also has the majority of its unsaturation in the main hydrocarbon chain, providing polymers of improved elastically characteristics. Also, it has been found that the high trans-1,4-unsaturation of many of the useable diene intermediate polymers gives urethane rubbers which appear to crystallize on stretching in a manner reminiscent of natural rubber. The presence of more than two hydroxyls in the polymer molecule provides cross-linking sites without the need to employ excess isocyanate or other extraneous cross-linking agents, e.g., triol, in the later polymerization.

The dienes which are employed to make the first intermediate polymers are unsubstituted, 2-substituted or 2,3-disubstituted 1,3-dienes of up to about 12 carbon atoms. The diene preferably has up to 6 carbon atoms and the substituents in the 2- and/or 3-position may be hydrogen, alkyl, generally lower alkyl, e.g. of 1–4 carbon atoms, aryl (substituted or unsubstituted), halogen, nitro, nitrile, etc. Typical dienes which may be employed are 1,3-butadiene, isoprene, chloroprene, 2-cyano-1,3-butadiene, 2,3-dimethyl-1,3-butadiene, etc. The choice of diene will usually depend upon properties desired in the final elastomer resin; for example, chloroprene may be used, alone or in admixture with other dienes to produce oil-resistant and flame-proof rubbers.

The hydroxyl-terminated diene homopolymer and copolymer products used in accordance with the present invention preferably have a hydroxyl-functionality greater than two, e.g., in the range of 2.1 to 2.6, although the functionality may exceed the range cited, e.g., it may range up to three or more. Those polymers of greatest utility have been found to have primary hydroxyl groups in terminal allylic positions on the main, generally longest, hydrocarbon chain of the molecule. By "allylic" configuration is meant the alpha-allylic grouping of allylic alcohol, that is, the hydroxyls of the intermediate polymer or the hydroxyl residues of the finished elastomer are attached to a carbon adjacent to a double-bond carbon.

The number and location of the hydroxyl groups and the molecular weight of the liquid intermediate polymer are for the most part a function of polymerization temperature and the type of addition polymerization system employed in forming the polymer. It has been found that diene polymers of the desired configuration may be obtained using hydrogen peroxide as the catalyst for polymerization. This free-radical addition polymerization usually takes place at a temperature of about 100–200° C., preferably about 100–150° C. The reaction preferably takes place in a mutual solvent system; that is, one which dissolves both the diene monomer and the hydrogen peroxide. Suitable solvents are isopropanol, acetone, methanol, sec-butanol, n-butanol, n-propanol and like alcohols having 2 to about 12 carbon atoms. The $H_2O_2$-solvent system is found to supply hydroxyl groups and the catalytic and solvent effects needed to produce the first intermediate diene polymers of desired chemical and physical characteristics. In such a polymerization system, the alcohol serves as a solvent for the peroxide and as a solvent or diluent for the diene monomer and is used in an amount suitable to promote adequately rapid but controllable polymerization of the monomer material in the solution to form the diene polymers. The alcohol will be free of any group which would interfere with the production of the desired diene polymer. Saturated alcohols are preferred and often those having about the same carbon atom content as the diene monomer will be found most useful. Thus propanol or isopropanol is often used in butadiene polymerization. The $H_2O_2$-alcohol system may also contain ketones, ethers, alcohol-ketones, alcohol-ethers and alcohol-esters which are miscible in water in all proportions and which do not contain polymerizable carbon-to-carbon unsaturation or otherwise interfere with polymerization or enter into the product. The peroxide material may be used in amounts of about 1% to 10% of the reaction mixture to assure a low molecular weight addition polymer product having more than about two hydroxyl groups per molecule.

The usable liquid (including semi-solid, etc.) first intermediate polymers of butadiene will preferably conform to the following simplified chemical structure

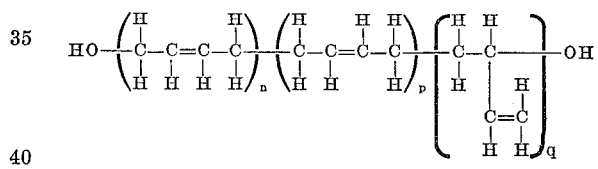

in which $n$ plus $p$ is greater than $q$, that is, the in-chain unsaturation accounts for more than 50% of the unsaturation. One or more of the H atoms appearing in the above formula will be replaced by hydroxyl in at least some of the molecules. This formula should not be understood as implying that the polymers are necessarily in blocks, but the cis-1,4-, trans-1,4- and vinyl (1,2) unsaturation are usually distributed throughout the polymer molecule. The letter $n$ may be a number sufficient to give a cis-1,4-unsaturation content of about 10–30 percent; $p$ may be a number sufficient to give a trans-1,4-unsaturation content to the polymer in the range of about 40–70 percent while $q$ may be sufficient to give a pendant 1,2-vinyl unsaturation of about 10–35 percent. Often the polymer will contain largely trans-1,4-units, e.g., about 50–65 percent and about 15–25 percent cis-1,4-units, with about 15–25 percent 1,2-units. Branching may also occur in the above polymers, especially those prepared at higher temperatures. It should be emphasized, however, that the present invention is not necessarily limited to the use of hydroxyl-containing polydiolefins having the predominating trans-1,4-structure, although such are highly preferred, where otherwise suitable polymers having high cis-1,4-forms are available.

Olefinically unsaturated monomers may be incorporated into the diene intermediate polymer products used in this invention and these may often be components which provide additional cross-linking sites for the diisocyanate or other urethane-producing agent. Usable monomers include alpha-mono-olefinic materials of about 2 or 3 to 10 or 12 carbon atoms such as styrene, vinyl toluene, methyl methacrylate, methylacrylate, acrylic esters, vinyl chloride, vinylidene chloride, etc. Acrylonitrile, acrylic acid, vinylidene cyanide, acrylamide, etc., provide low-molecular weight hydroxy-terminated diene intermediate copolymers which have sites suitable for cross-linking. As can be seen, the useable olefinic monomers may be ethylenes, substituted with halogen, aromatic hydrocarbon, or even cyano or carboxyl-containing radicals in some instances. The choice and amount of mono-olefinic monomer employed will often be determined on the basis of properties desired in the final elastomer resin. For example, solvent-resistant rubbers may be formulated by copolymerization of butadiene with acrylonitrile, or other mono-olefin, substituted with a non-hydrocarbon radical, to produce the first intermediate polymer. Generally the amount of mono-olefinic monomer in the polymer will be about 0–75% by weight of the total addition polymer, preferably about 1 to 40%, or even about 10–40%.

In addition to the homopolymers and copolymers comprised of single dienes and single mono olefinic monomers, the present invention may also use polymers made from combinations of a plurality of dienes and mono-olefinic monomers. For example, mixtures of butadiene, isoprene and styrene can be polymerized to afford low molecular weight hydroxyl-containing interpolymers. Various combinations of dienes and mono-olefinic monomers may be copolymerized to produce hydroxyl-containing copolymers or interpolymers which may be in turn converted by condensation polymerization to produce urethane and related linkages. Also, the polymer materials used in this invention may be given improved oxidation and ozone resistance by hydrogenating the hydroxyl-containing diene homopolymers and/or interpolymers to their corresponding more-saturated derivatives. Usually, the hydroxyl-containing diene homopolymers and copolymers used in the present invention will at most be only partially hydrogenated, so as to provide a material which is more stable due to diminished unsaturation but which still has good elastomer properties.

The essential condensing, chain-extending and/or cross-linking agents which are employed in this invention are materials containing two or more isocyanate radicals. The useable agents for making the extended polymers of this invention include the aliphatic and aromatic diisocyanates such as tolylene diisocyanate (TDI), 4,4'-diphenylmethane diisocyanate, 1,5-naphthalene diisocyanate, phenylene diisocyanates, or mixtures of these materials, transvinylene diisocyanate, p,p'-diphenylmethane diisocyanate, and hexamethylene diisocyanate, as well as related aromatic and aliphatic isocyanates, which may also be substituted with other organic or inorganic groups that do not adversely affect the course of the chain-extending and/or cross-linking reaction. These diisocyanates can be reacted with the diene first intermediate polymers at ambient temperatures to form urethane linkages, apparently due to the increased reactivity given the hydroxyl groups by the allylic configuration.

In addition to the simple diisocyanates described above, the hydroxyl-containing, chain-extendible diene materials can be condensed with isocyanate polymers, such as polyarylene polyisocyanate (PAPI) and/or with isocyanate-terminated polyhydroxy materials, e.g., polyesters, etc., which are generally produced by reacting the isocyanate with, for example, polyglycols (such as polypropylene glycol) and polyesters (for instance of glycols, including polyglycols and polycarboxylic acids, such as polyethylene adipate). These materials may be reacted with an excess of a diisocyanate. An example of such a material is the product obtained by the reaction of one mole of propylene glycol with 2 moles of 2,4-tolylene diisocyanate as shown below:

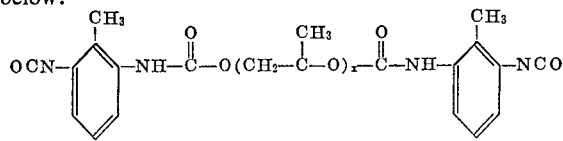

Isocyanate terminated polyether

As mentioned, polyisocyanates such as the materials sold commercially as PAPI (polyarylene polyisocyanate) of the following structure:

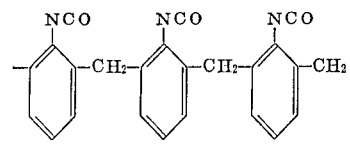

can also be employed. Other isocyanate reactants which can be utilized in the manufacture of the products of the present invention are isocyanate terminated prepolymers prepared by the reaction of tolylene diisocyanates or other isocyanates with hydroxyl or amine-terminated polyesters, polyethers, or polyamides. The isocyanate materials are often used in an amount sufficient to supply 0.1 to 10 NCO groups per OH group of the diene intermediate polymer, preferably about 0.5 to 5 isocyanate groups per hydroxyl. When simple diisocyanates are used, it is preferred to employ about 4–10%, say about 5–8% diisocyanate by weight of the diene intermediate polymer, or other hydroxyl-terminated polymer which enters the urethane reaction.

In some situations, it may be prefered to employ isocyanate-terminated diene prepolymers. Such prepolymers lend themselves to the preparation of "two-step" polymers wherein the second polymerization step the terminal isocyanate residues of different molecules are joined by means of suitable difunctional compounds such as glycols, diamines or even, in some cases, water. These prepolymers are prepared using a large excess of isocyanate to react with the hydroxy-terminated diene polymer. Usually at least about two moles diisocyanate will be provided for each mole of diene polymer and those prepolymers having more than 3%, preferably 6–9%, free —NCO (as determined by dibutylamine titration) are found to have the best storage stability. These prepolymers generally have toxicity characteristics much lower than diisocyanate monomers.

These prepolymers may be reacted with polyhydroxy materials such as glycols, including polyglycols, polyesters and further amounts of hydroxyl-terminated polydiene, to give additional urethane linkages in the finished polymer. When reacted with diamines, urea-urethane polymers are formed. Urea-urethane polymers also may be formed in a single step by concurrent reactions among the diene polymer, the polyisocyanate and the diamine.

A wide variety of aromatic and aliphatic diamines may be employed as a reaction component to make oil-extended urea-urethane elastomers of the present invention. These diamines may be used in an amount sufficient to provide one amino group for each 0.11 to 9 hydroxyl groups, that is, in the total of amino and hydroxyl groups, the amino groups may represent about 10–90% of the total and hydroxyl groups may represent about 90–10% of the total. The amino material may be from 0.1 to 99.9% of the total of amino and hydroxyl material, but of course, enough of the diene intermediate polymer residue will be present to give the desired amount of oil-extendibility. Preferably in the urea-urethane polymer there will be about 1 to 1.5 isocyanate residues for each amino and hydroxyl residue.

Typical amines of up to 40 or more carbon atoms which may be employed are aromatic diamines (both substituted and unsubstituted) such as 4,4'-methylene bis (2 - chloroaniline) (MOCA), 3,3'-dichlorobenzidine (DCB), N,N'-disecondarybutyl p-phenylene diamine, N,N'-dibenzylethylene diamine, methane diamine, ethylene diamine, ethanolamines, hydroxylamine, p,p'-diphenylamine, p-phenylene diamine, heaxmethylene diamine, diethylene triamine, tetraethylene pentamine, lauroguanamine, and amine-terminated products obtained from the reaction of dibasic acids with diamines; e.g., the reaction products of dimerized unsaturated fatty acids with diamines. Diamides of similar carbon atom range can also be employed as chain extending agents; e.g., materials made by the reaction of dibasic acids, acid chlorides or anhydrides with ammonia.

Other products which are useful are the reaction products of polyethers (e.g., poly(oxypropylene)glycol and polytetramethylene glycol) and ethylenimine; reaction products of hydroxyl-terminated polyesters with ethylenimine are also useful as amine reactants for preparing urea-urethanes in accordance with the present invention. Amine-terminated polybutadiene homopolymers and copolymers which have been made by the reaction of the hydroxyl-terminated polybutadiene homopolymers and copolymers of the present invention with ethylenimine are also suitable as co-reactants in the production of oil-extendible, urea-urethanes of the present invention. It is particularly noteworthy, that many highly reactive amines (e.g., amines which are ordinarily too reactive for use in urea-urethane elastomer systems derived from polyether or hydroxyl-terminated polyesters) can be employed in the production of oil-extended urea-urethane elastomers of the present invention—namely because the pot life of the liquid castable system is greatly enhanced by the use of the extending oils or resins which are employed in the present invention.

The conditions for the polymerization of this invention may vary, depending upon the chain-extending agents employed. With the preferred agents, arylene diisocyanates such as tolylene 2,4- and 2,6-diisocyanates, the chain-extending reactions may be carried out conveniently at ambient temperatures, which may require from 1 hour to several days, depending upon whether or not catalysts are employed in the reaction. Temperatures below ambient may also be employed. Elevated temperatures enhance cross-linking of the isocyanate-extended hydroxyl-terminated diene polymers. Thus, after chain-extending at ambient temperatures the temperature may be raised to up to about 200° C. or both chain-extension and cross-linking may be obtained simultaneously at these higher temperatures. Thus, isocyanate reactions are preferably conducted at temperatures of about 25–150° C.

The polymerization usually can be conducted without the use of catalysts. However, in order to accelerate cure times catalysts such as dibutyl tin dilaurate, stannous octoate, diazobicyclooctane (DABCO), diethylene triamine, cobalt naphthenate, etc., are often used. Many other organometallic and amine catalysts, such as those ordinarily employed in the production of conventional urethane elastomers, coatings, sealants, caulks, foams, etc., can be used to produce products of the present invention. When used, the catalyst will often appear as about 0.1 to 0.5, preferably about 0.2 to 0.4 part per 100 parts of diene polymer. Since the isocyanate moiety is sensitive to water, the isocyanate reactant should be essentially isolated from water, air, etc., before the reaction. Also, the polydiene and other reactants should be degassed in vacuo, when needed, to remove moisture before the reaction.

Other polyhydroxyl-containing materials, for instance up to about 90 weight percent based on the polydiene, preferably about 5 to 50 weight percent, may be incorporated with the hydroxyl diene partial polymer fed to the reaction, the individual hydroxyls being linked together with diisocyanates or other chain-extending agents. For example, a hydroxyl-containing first intermediate polydiene may be mixed with polyhydroxy materials such as polypropylene glycol, polyethylene glycol, interpolymers of polyethylene and polypropylene oxides, and hydroxy-terminated polyesters, e.g., of polyols and polycarboxylic acids, which are normally employed to make conventional urethane rubber. Examples of such materials are polyoxypropylene glycols known commercially as Pluracols, Carbowax, etc. Polyfunctional polyols such as trimethylol propane, pentaerythritol, glycerol, etc., or propylene and ethylene oxide adducts of these materials may likewise be employed in the extended urethane systems comprised of hydroxyl-terminated diene homopolymers and copolymers. In such cases polymers are formed which have polydiene moieties linked through chain-extension and/or cross-linking at the hydroxy residues to saturated glycol, polyolefin, polyether or polyester moieties. The polydiene glycol as well as the other glycols may appear in chain-extended blocks in the final polymer product. For example, when a low molecular weight hydroxyl-containing polybutadiene is reacted with a diisocyanate, such as 2,4-tolylene diisocyanate, a polyolefin-polyurethane elastomer of the simplified following structure results:

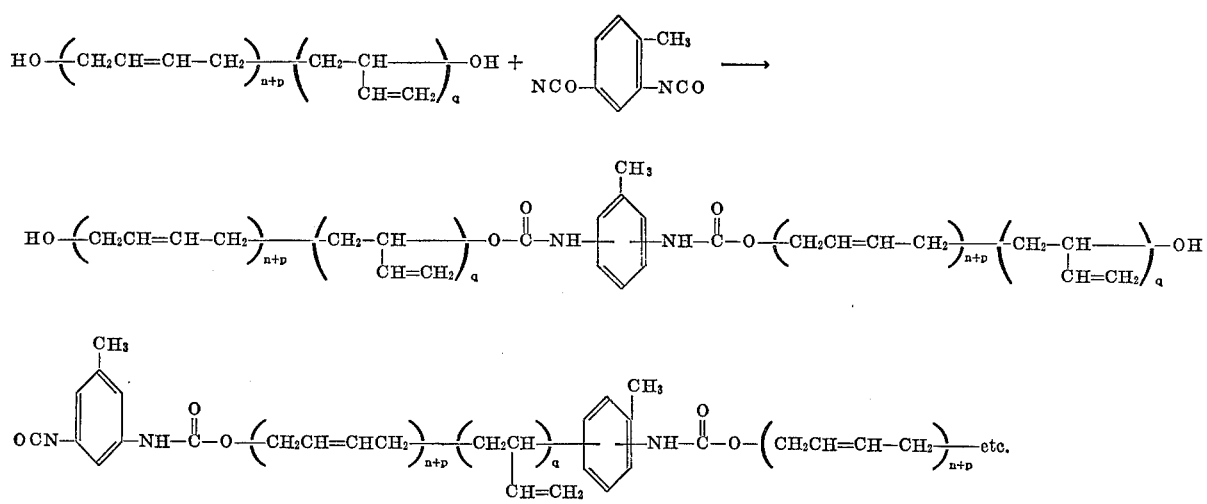

As shown above, the resulting high molecular weight polydiene-polyurethane elastomer may be either hydroxyl-terminated, isocyanate-terminated, or both, depending upon reaction conditions or the ratio of diisocyanate to hydroxyl-containing polydiene employed in the condensation polymerization. It also will be observed that the chain-extended polymer provides amino nitrogen having replaceable hydrogen which can be exploited in the cross-linking. Typical reactions and reagents for cross-linkable polymer production are illustrated below:

and other materials conventionally employed to vulcanize natural rubber, GRS rubber and related synthetic polyurethane and polyester-polyurethane elastomers with the randomly blend or co-react conventional polyether-polyurethane and polyester-polyurethane elastomers with the

POLYOLEFIN-POLYETHER-URETHANE RUBBER

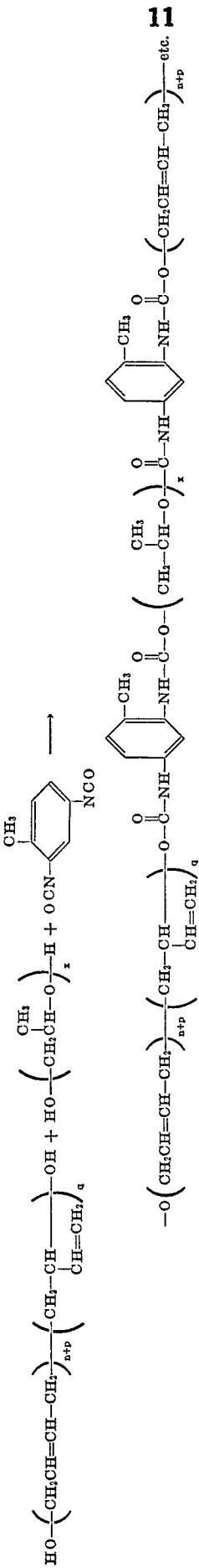
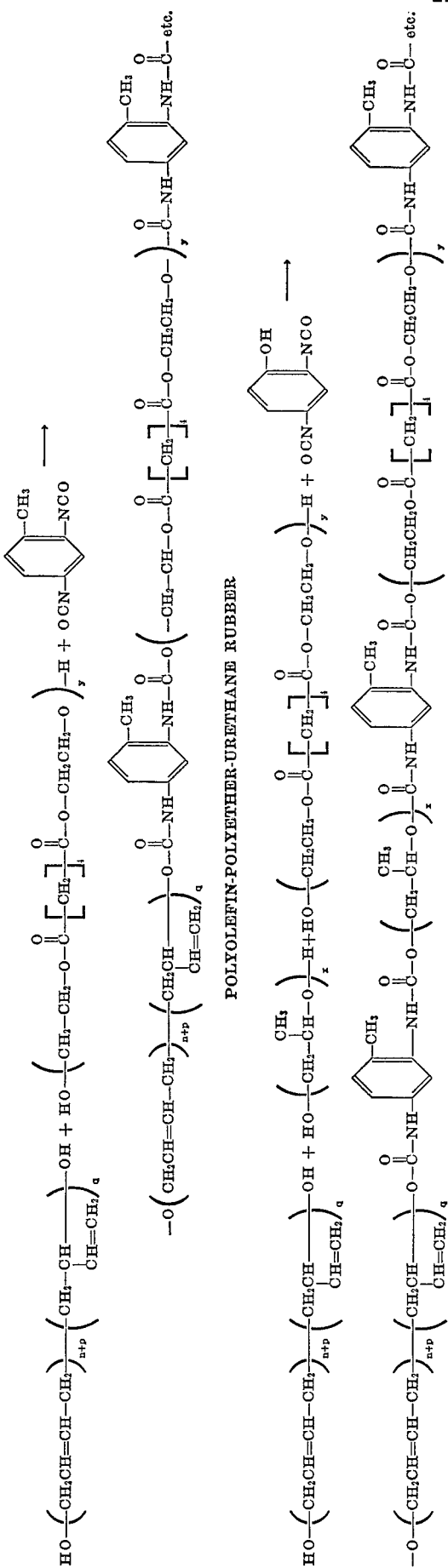

The cross-linking of proximate chains of the second intermediate polymer may be brought about through the polydiene residues, the chain-extending agent residues, or both. Dimerization and polymerization reactions between cross-linking agent residues have been described above. In addition, gamma radiation, common vulcanization agents, etc., may be employed to bring about cross-linking at the double bonds of polydiene residues in adjacent polymer molecules. Sulfur, used as sulfur, thiuram derivatives olefin rubbers, may thus be added to the chain-extended polymer to promote cross-linking. Generally, amounts of vulcanizing agents common to the art can be herein, employed for instance, about 1-50 parts, preferably about 1-10 parts by weight per part of polymer, as well as conventional vulcanization temperatures. The tailor-making of block urethane polymers composed of varying amounts of diene blocks and diene-vinyl blocks, as well as polyether and/or polyester blocks, enables one to polymers. Furthermore, the diene-urethane polymers or other chain-extended polymers (including the diene-polyether-polyesterurethane block polymers) may be blended for co-vulcanization with conventional diene rubbers such as natural polyisoprene, GR–S rubber, GR–N rubber, Neoprene rubber, etc. In essence, the present invention makes possible the production of cross-linked urethane rubbers which can be made compatible with practically all types of synthetic and natural rubbers presently produced. Thioplast materials containing a plurality of sulfur linkages can also be coblended and co-cured in a similar fashion. It should be pointed out that the finished elastomer still usually contains an abundance of olefinic unsaturation.

When hydroxyl-terminated polyesters or polyethers are employed in conjunction with the hydroxyl-containing diene polymers, these polyesters or polyethers may be converted to isocyanate-terminated prepolymer, which in turn may be utilized in conjunction with the hydroxyl-terminated diene homopolymers and copolymers to form urethane elastomer system which are oil extendible. Commercial materials of this type may be urethane prepolymers based on poly-(1,4-oxybutylene glycols) and known as Adiprene L. Other commercial materials are isocyanate-terminated poly (oxypropylene glycols) or polyoxyethylene glycols and isocyanate-terminated polyesters. The latter are known as Multrathanes.

Most oils commercially available for rubber processing may be used for oil extension of the polyurethanes of this invention. There are many such processing oils on the market, see, for example, the list contained in U.S. Pat. 3,107,224, and they can be classified by source into the following groups: petroleum oils and asphalts, petroleum waxes, coal tar oils and pitches, esters, ethers, chlorinated hydrocarbons, vegetable oils and fatty acids, pine tars and oils, phenols and resins. All of these commercially available materials are essentially hydrocarbon, that is, at least about 50% by weight carbon and hydrogen. Preferably, the oil is at least about 75% or more preferably at least about 90% carbon and hydrogen. As is apparent from the materials listed, the hydrocarbon chains or rings may be interrupted or terminated by nonhydrocarbon groups, for instance, ester, ether, or other oxygen-containing linkages.

Usable extender oils are characterized by a viscosity SUS at 100° F. of at least 30, preferably at least about 70. Petroleum oils are most often used in extending natural and synthetic rubbers including those of this invention and generally are categorized as paraffinic, naphthenic (cycloaliphatic), aromatic or asphaltic oils but extenders which combine characteristics of two or more of these types also may be employed. Viscosities frequently vary from about 100–600 SSU at 100° F. or 35–100 SSU at 210° F. although aromatic and/or asphaltic oils of up to 1000 or 2000 or more SSU at 100° F. are sometimes used.

Coal tar pitch, asphalts, asphaltenes, chlorinated biphenyl ethers, chlorinated waxes, chlorinated oils, rosin esters, certain esters and amides of styrene-maleic anhydride resins, coumarone-indene resins, polybutenes, as well as many other materials may be used, either alone or in conjunction with oils, the whole of which may be incorporated within the various urethane or urea-urethane compositions of the present invention. For example, in rubber compounding, certain resins are employed to impart special properties to rubber vulcanizates in order to improve cut growth or tear strength, to assist in vulcanization, to add tack, etc. A compilation of resin materials usable in rubber processing, and in the present invention, is given in an article appearing in Rubber Chemistry and Technology, vol. 36, No. 5, pp. 1542–1570, December 1963. Materials of this type are usually not useful with conventional urethanes or urea-urethanes based on hydroxyl-terminated polyesters or polyethers, largely because of their incompatibility with these systems. Such materials as pitch and asphalt of high carbon content can be considered as carbon dispersions in hydrocarbon oil, supplying both hydrocarbon oil for polymer extension and carbon for filling and reinforcing the urethane rubber.

Synthetic plasticizers, such as adipate and phthalate esters or esters of trimethylol propane, glycerine, pentaerythritol and the like may also be employed, especially with those urethanes prepared from butadiene and acrylonitrile. Aromatic and chlorinated oils also are advantageous for use with such urethanes. Extenders composed mainly of hydrocarbons are usually preferred because of their improved hydrolytic properties, oxidative properties and lower cost. Extender oils may also be low molecular weight polybutenes or polyisobutylenes or may also be high boiling fractions of petroleum polymers ordinarily used for lubricants. Chlorinated aromatic and aliphatic hydrocarbons, aromatic ethers, and phosphorus derivatives are particularly attractive as extenders, since they may impart some flame retardance to the finished product. Unsaturated or saturated vegetable oils, e.g., castor oil, may also be employed in systems of the present invention. The extender oil used in any particular instance shows compatibility and can be incorporated within the finished urethane network without excessive bleeding or greatly diminishing the physical properties. Also, it should have a suitably low vapor pressure at the temperature at which the finished product will be used.

In preparing light colored elastomers and foams, it is preferred of course to employ the so called "non-staining" oils which may be hydrogenated neutral oils of varying viscosities. Commercial products of this type are widely employed for extending GR–S rubber, solution polymerized butadiene-styrene rubber, etc.

The extender agent may comprise about 1–500% or more of the finished polymer product, preferably about 5–150%, based on the weight of the polydiene polymer. Although the extender oil may be added to the polymer at any time before its final curing, e.g., during polymerization or while the polymer is in a millable, gel state, it is most convenient to add the oil to the polydiene intermediate polymer monomer before the polymerization. In those polymerization systems which take place at ambient conditions it is well to add the oil before the monomers are blended to form the polymerization mixture. In other systems, the oil may be added after the monomers are blended. As previously mentioned, the presence of the extender oil in the monomer mixture tends to increase the pot life of the mixture. It may also require higher polymerization temperatures or the presence of a catalyst to shorten polymerization time.

In accordance with the present oil-extended urethane elastomers, finely divided solid fillers which are commonly employed in the art either as reinforcing fillers or inert fillers can be utilized. Some conventional fillers are carbon black, asphaltenes, silica, silica-alumina, hydrated silica, zinc oxide, magnesium carbonates, clays, talc, and pulverized reclaimed rubber as well as various mineral fillers which are known in the art. Carbon black and silica fillers are particularly suitable, since they contribute to the enhancement of physical properties in the final product. An increase in elongation, with little or no decrease in tensile properties can be expected upon oil dilution plus carbon black reinforcement. This improvement is found even without milling of the carbon black in the polymerization mixture components. Solid fillers may be employed in the amount of 0–100 or more parts per 100 parts of diene polymer in the final product, and when used in significant amounts usually at least about 5% is employed, based on the diene polymer.

An extremely significant advantage of the oil-extended urethane elastomers of the present invention is their ability to be readily incorporated or blended with other conventional rubbers, particularly hydrocarbon rubber types such as emulsion GR–S rubber, solution butadiene-styrene rubber, cis-polyisoprene rubbers (both synthetic and natural). The urethane elastomers of the present invention, such as the urethane systems derived from acrylonitrile-butadiene hydroxyl-terminated polymers are also millable with rubbers such as GR–N, acrylic rubbers polypropylene oxide rubbers and the like.

The rubbers in which the hydroxyl-terminated polybutadiene homopolymers and copolymers are blended or chemically incorporated may be extended with various extender oils and may be filled with inert or reinforcing fillers. The advantage of these systems is that the incorporation of the urethane systems within the conventional rubber systems enables urethane properties to be imparted to these systems. The systems may then be concurrently cured via the isocyanate reactions as well as by peroxide or sulfur cures which take place via double bond reactions or via free radical formation and coupling reactions.

The solid fillers, general or special purpose rubbers or other resins or plasticizers which may be incorporated into the oil-extended urethane elastomers of this invention preferably are included in the reaction mixture prior to curing, although they may be incorporated during or subsequent to curing. These solids often will be added to the polydiene intermediate polymer as a solution, suspension or slurry in the extended oil before the isocyanate material is added.

It may be desired to include an antioxidant in the polymer formulation, in which case about 0.5 to 2.0 parts, per 100 parts of polydiene polymer, of such materials as 4,4'-methylene bis (2,6-di-tert-butylphenol) (Ethyl Corp. Antioxidant 702), or 4,4-methylene bis (6-tert-butyl-o-cresol) (Ethyl Corp. Antioxidant 720) may often be used.

EXAMPLES

The following examples of the polymers and method of this invention are to be considered illustrative only and not limiting. In these examples, polybutadiene No. 45 is a polybutadiene homopolymer having a viscosity of 50 poises at 30° C., a hydroxyl content of 0.95 meq./gm., a hydroxyl number (mg. KOH/gm.) of 53, an average molecular weight of 2200-2500, about 2.1-2.2 terminal, allylic, hydroxyl groups which are predominantly primary, and an iodine number of 398. It can be prepared by polymerizing 100 parts of butadiene in the presence of 70 parts of isopropanol and 10 parts of hydrogen peroxide in an aluminum clad autoclave at 118° C. for 2 hours. Extender oils DHN 200 and DHN 300 are hydrogenated, non-staining petroleum based rubber processing oils having the following properties:

|  | 200 | 300 |
| --- | --- | --- |
| Specific gravity (60/60) | 0.9024 | 0.9117 |
| Viscosity (SSU/100° F.) | 180 | 540 |
| Color, Saybolt | 30+ | +25 |
| Aniline point, ° F. | 198 | 205 |
| Percent aromatic | 0 | 0 |
| Percent naphthenic | 58 | 57 |
| Percent paraffin | 42 | 43 |

Indopol H-300 is a liquid polyisobutene oil having a viscosity of 3000 SUS at 210° F. and a mean molecular weight of about 1100. 300 pale oil is a 300 SUS at 100° F. viscosity naphthenic petroleum lubricating oil. Polybutadiene No. 15 is a homopolymer having a viscosity at 30° C. of 200 poises, a hydroxyl content of 0.80 meq./gm., a hydroxyl number of 45 mg. KOH/gm., an average molecular weight of 3000-3500, about 2.6 terminal allylic hydroxyl groups which are predominantly primary and an iodine number of 395. It is made by polymerizing 100 parts of butadiene in the presence of 35 parts of isopropanol and 6 parts of hydrogen peroxide for 2½ hours at 130° C. Styrene copolymer No. 15 has a molecular weight of about 2200-2500, a viscosity at 30° C. of 250 poises, a hydroxyl content (meq./gm.) of 0.95, a hydroxyl number of 53 mg. KOH/gm., about 2.5 terminal, allylic, hydroxyl groups which are predominantly primary; and an iodine number of 335. It is made by polymerizing 75 parts butadiene and 25 parts styrene in the presence of 70 parts isopropanol and 10 parts of 50% hydrogen peroxide for 2½ hours at 120° C. Acrylonitrile copolymer No. 15 has a viscosity of 550 poises at 30° C., a hydroxyl content of 0.80 meq./gm., a hydroxyl number of 45 mg. KOH/gm., an average molecular weight of 2500-3000, about 2.5 terminal, allylic hydroxyl groups, which are predominantly primary, and an iodine number of 345. It is made by copolymerizing acrylonitrile with butadiene in isopropanol solvent and in the presence of hydrogen peroxide using the following ratio of reactants: 85 parts butadiene, 15 parts acrylonitrile, 70 parts isopropanol, 10% hydrogen peroxide. The reactants are heated in an autoclave at 118° C. for 1½ hours and stripped. Mul F-66 is an isocyanate-terminated, linear adipic acid-ethylene glycol polyester from Mobay Chemical Company. It has the following properties:

Appearance: amorphous yellow solid
Free —NCO content: 6.3 to 6.7%
Viscosity, centipoise at 163° F.: 1800-2500
Melting range ° F.: 107-116

Paroil 142 is a chlorinated paraffinic hydrocarbon of 40-46% chlorine. It has a specific gravity (60/60) of 1.16-1.2, a viscosity SUS at 210° F. of 150-280 and is subject to 0.2% maximum HCl loss. Pontrar is an asphalt of 20-60 penetration having a softening point (ASTM-D36) of 36° F. and a needle pin penetration at 77° F. of 40-60 (ASTM-D5).

EXAMPLE I (IA) One hundred parts of polybutadiene No. 45 was mixed with 7 parts of tolylene diisocyanate (a commercial mixture of 80% 2,4-TDI and 20% 2,6-TDI) and the mixture was placed in a rubber mold and heated in a press at about 100° C. for 4 hours. A rubbery elastomeric material was obtained showing a tensile value of 100-150 p.s.i. and an ultimate elongation of 350-500%.

(IB) In a similar run, 10 parts by weight of extender oil DHN 200 is added to the liquid polybutadiene homopolymer prior to addition of the tolylene diisocyanate. The mixture was cured at 100° C. for about 4 hours and showed elastomeric properties similar to those displayed by the unextended polybutadiene. The gumstock was somewhat softer, but still retained good physical properties.

EXAMPLE II

In another run, 93 parts of hydroxyl-terminated polybutadiene No. 45 homopolymer and 7 parts of commercial tolylene diisocyanate were thoroughly mixed and degassed in vacuo. The castable mix was poured into a rubber mold and cured at room temperature for 3 days prior to removing the cured stock. The resulting elastomer showed an ultimate tensile strength of 100 p.s.i., and ultimate elongation of 378 percent. This run was repeated using 20% of DHN 200 rubber extender oil added prior to adding the tolylene diisocyanate. The resulting mixture was then cured at 100° C. for about 4 hours. The gumstock was soft, but retained good physical properties.

EXAMPLE III

In another run, 100 parts of the butadiene homopolymer No. 45 was blended with 30 parts of DHN 200 rubber extended oil. To this mixture was added 10 parts of carbon black. Seven parts of tolylene diisocyanate and 0.4 part of dibutyl tin dilaurate catalyst was added and the mixture was cured in a rubber mold at ambient temperature or at 100° C. for about 4 hours. The resulting product showed excellent physical properties in comparison with an unreinforced gumstock. This run was repeated and the concentration of oil diluent was varied from about 10% to 50% and the carbon black loading varied from 5% to 40%. All the resulting elastomers had good physical properties in comparison with the unfilled and undiluted homopolymer gumstocks.

EXAMPLE IV

In another run, 100 parts of polybutadiene No. 45 homopolymer was diluted with 20 parts of a liquid polybutene oil Indopol H–300. The resultant mixture was mixed with 7 parts of tolylene diisocyanate and cured at ambient temperature for several days. The resulting product showed good physical properties and good adhesion to metallic and wood substrates.

EXAMPLE V

In another run, 100 parts of polybutadiene No. 45 was diluted with 20 parts of the liquid polybutene Indopol H–300 and 10 parts of carbon black. Seven parts of TDI was added and the mixture permitted to cure at ambient temperature for several days. A very elastomeric substance was obtained showing good physical properties.

EXAMPLE VI

In another run, 94 parts of hydroxyl-terminated polybutadiene homopolymer No. 15 was mixed with 6 parts of tolylene diisocyanate and cured at room temperature for 2 days in the mold and one week after removal from the mold. The material showed an ultimate tensile strength of 118 p.s.i. and ultimate elongation of 186%. This procedure was repeated with the addition of varying quantities of DHN 200 rubber extender oil, e.g., from 10–50%. The systems still retained good elastomeric properties upon dilution with oil. The cure times were longer, e.g., they were proportional to the extent of oil dilution employed. The addition of carbon black fillers to the above systems in the range of 10–40% greatly increased the physical properties of the finished elastomers. In addition to the carbon black fillers employed in the above examples, elastomers were prepared using silica filler at levels of 10 to 50%. The resulting elastomers were greatly reinforced by these additions.

Similarly, mixtures of rubber extender oils and silica fillers were employed to afford elastomers varying greatly in tensile, modulus hardness and elongation. Pulverized reclaimed rubber and other inert fillers such as ZnO, clay, talc and the like were also suitable for use in the systems described above.

EXAMPLE VII

In another run, one hundred parts of styrene copolymer No. 15 was mixed with 7 parts of tolylene diisocyanate and cured at room temperature for several days. An elastomer showing the following properties was obtained: Ultimate tensile 152 p.s.i., Utilmate elongation 445%, Shore A hardness 36–38.

In another series of runs, the butadiene-styrene copolymer No. 15 was diluted with varying quantities of 300 pale oil. For example, 100 parts of the copolymer, 10 parts of oil and 7 parts of TDI were mixed and cured; similarly 100 parts of copolymer, 20 parts of oil and 7 parts of TDI were admixed and cured at ambient temperature and at 100° C. The oil extended products showed good physical properties and did not bleed, even at elevated temperatures. Varying quantities of carbon black, e.g., from 10 to 40 percent were incorporated in elastomer compositions as described, e.g., those containing from 10 to 40 parts of extender oil per 100 parts of hydroxyl-terminated polybutadiene and 7 parts of tolylene diisocyanate. Carbon black greatly contributed to the reinforcement of these materials and to increasing hardness. Antioxidants such as 2,6-ditertiarybutylphenol and methylene bis(2,6-ditertiarybutylphenol) were also employed in many compositions and aided in their stability at elevated temperatures. Silica reinforcement was also studied in these styrene-butadiene copolymers in much the same manner as with carbon black. Silica reinforcement likewise gave products showing good elastomeric and tensile properties.

EXAMPLE VIII

In another run, 100 parts of hydroxyl-terminated butadiene-acrylonitrile copolymer No. 15 was admixed with 6 parts of tolylene diisocyanate and the mixture cured at ambient temperature after several days to give a product showing good physical properties. These urethane resins could be extended with aromatic oils, e.g., 300 pale oil or with organic esters such as di(2-ethylhexyl)sebacate or chlorinated biphenyl ether. Carbon black and silica reinforcement was likewise effective for reinforcing the butadiene-acrylonitrile copolymers.

EXAMPLE IX

In another experiment, 83 grams of hydroxyl-containing polybutadiene No. 45 was admixed with 8.3 grams of polypropylene glycol (1010 molecular weight a product prepared by Wyandotte Chemical Company). The mixture was mixed with 7.7 grams of TDI and 1 gram of tributyltin chloride and cured at ambient temperature. The resulting elastomer showed the following properties: ultimate tensile 118 p.s.i., ultimate elongation 700%, 100% modulus 46, and 300% modulus 72.2.

In another run, 82.7 parts of butadiene homopolymer No. 45 was admixed with 8.1 parts of polypropylene glycol (710 molecular weight) and 8.2 parts of tolylene diisocyanate plus 0.9 part of tributyl tin chloride and cured at ambient temperature. The product showed an ultimate tensile of 132 p.s.i., ultimate elongation of 482% and 100% modulus of 62.5 p.s.i.

In another run, 82.8 parts of the polybutadiene No. 45 hydroxyl-terminated homopolymer was admixed with 7.1 parts of polypropylene glycol (410 molecular weight) and 9.1 parts of tolylene diisocyanate and cured 20 hours at 80° C. The product showed the following properties: Tensile strength, p.s.i. 168, ultimate elongation 658%, 100% modulus 70.3, 300% modulus 106, and 500% modulus of 157.

Oil extended elastomers were prepared from the three polypropylene glycol copolymers of this example by adding varying quantities of DHN oils and 200 pale and 300 pale oils, with carbon black and silica reinforcing agents. The reaction mixtures, containing small amounts e.g., up to about 20% polypropylene glycol, gave fairly good physical properties upon oil extension and reinforcement with carbon black.

EXAMPLE X

A mixture of 100 parts of hydroxyl-terminated polybutadiene homopolymer No. 45 was admixed with 100 parts of Mul. F-66. The mixture was cured at 80° C. for a period of 24 hours and showed good elastomeric properties.

An oil extended urethane product was prepared by admixing 100 parts of hydroxyl-terminated polybutadiene homopolymer No. 45 and 100 parts of the same isocyanate-terminated polyester and 20 parts of DHN 200 oil. The mixture was cured at 80° C. for a period of 24 hours. The resulting product showed good elastomeric properties and similarly, could be reinforced by including carbon black or silica in the formulation.

EXAMPLE XI

Table I below gives the physical properties of some oil-extended and carbon black reinforced urethane elastomers. These elastomers were made using Polybutadiene No. 45 which was reacted with commercial tolylene diisocyanate at a ratio of NCO groups to hydroxyl groups of 1.1. The extender oil employed was a petroleum hydrocarbon rubber process oil having a viscosity of about 200 SUS at 100° F. The carbon black and extender oil concentrations are given in the table in parts per hundred of the polybutadiene intermediate polymer employed. The urethane polymerization was performed in the presence of the carbon black and extender oil.

TABLE I

| Sample | Carbon black | Extender oil | Hardness Shore scale | Tensile strength, p.s.i. (ASTM D412 61T) | Elong., percent at break | Tensile modulus, p.s.i. at— 100% | 200% | 300% | Tear strength, p.l.i. (ASTM D634-51) | Tension set, percent |
|---|---|---|---|---|---|---|---|---|---|---|
| XI A | 0 | 0 | 41–43 A | 176 | 210 | 132 | | | 54.6 | 0 at 100% E. |
| XI B | 0 | 10 | 33–35 A | 135 | 267 | 88.0 | 121 | | 33.5 | Do. |
| XI C | 0 | 20 | 33–36 A | 139 | 267 | 89.0 | 124 | | 41.6 | Do. |
| XI D | 0 | 30 | 30–32 A | 114 | 263 | 72.1 | 102 | | 33.5 | Do. |
| XI E | 10 | 0 | 46–50 A | 381 | 334 | 175 | 266 | 363 | 73.8 | Do. |
| XI F | 10 | 10 | 43–47 A | 335 | 336 | 153 | 234 | 318 | 80.5 | Do. |
| XI G | 10 | 20 | 38–41 A | 250 | 361 | 120 | 177 | 226 | 31.7 | Do. |
| XI H | 10 | 30 | 37–39 A | 217 | 329 | 107 | 161 | 211 | 45.1 | Do. |
| XI J | 20 | 0 | 47–52 A | 556 | 345 | 196 | 336 | 510 | 124.8 | 0 at 200% E. |
| XI K | 20 | 10 | 41–44 A | 646 | 511 | 143 | 247 | 370 | 107 | 0 at 100% E. |
| XI L | 20 | 30 | 37–42 A | 529 | 485 | 136 | 234 | 340 | 92.4 | Do. |

EXAMPLE XII

In Table II the effect of oil extension and catalysis on gel time of the urethane resin is reported. The same commercial TDI and extender oil were employed as in the samples of Table I. The catalyst was dibutyl tin dilaurate and again concentrations are given in terms of parts per hundred parts polybutadiene partial polymer. The samples in this table used polybutadiene No. 15.

TABLE II

| Sample | Polybutadiene No. 15 (gms.) | TDI, gms. | Extender oil, gms. | Oil conc., p.p.h. | Catalyst, gms. | Catalyst conc., p.p.h. | Gel time, hrs. |
|---|---|---|---|---|---|---|---|
| XII A | 180 | 14.1 | 0 | 0 | 0 | 0 | 3.9 |
| XII B | 180 | 14.1 | 0 | 0 | 0.18 | 0.1 | 0.6 |
| XII C | 180 | 14.1 | 0 | 0 | 0.54 | 0.3 | 0.2 |
| XII D | 180 | 14.1 | 0 | 0 | 0.90 | 0.5 | 0.1 |
| XII E | 140 | 11.0 | 42 | 30 | 0 | 0 | 8.4 |
| XII F | 120 | 9.4 | 60 | 50 | 0 | 0 | 11.3 |
| XII G | 120 | 9.4 | 60 | 50 | 0.12 | 0.1 | 1.6 |
| XII H | 90 | 7.0 | 90 | 100 | 0.09 | 0.1 | 3.3 |
| XIII J | 120 | 9.4 | 60 | 50 | 0.36 | 0.3 | 0.6 |
| XII K | 75 | 5.9 | 102.5 | 150 | 0.23 | 0.3 | 1.6 |

EXAMPLE XIII

A typical urea-urethane polymer was prepared using Curithane C–126 (3,3-dichlorobenzidene) as the diamine and diphenyl methane diisocyanate (MDI) as the isocyanate component of the system.

Into a 500 ml. resin kettle was placed 219.7 gm. of the hydroxyl - terminated polybutadiene - acrylonitrile copolymer No. 15, 18.1 grams of Curithane C–126 and 0.24 gram of dibutyl tin dilaurate. The mixture was heated to 135° C. in vacuo for one hour and was subsequently cooled to 50° C. Twenty-nine and five tenths grams of MDI was then added and the mixture stirred rapidly. The mixture became rubberlike immediately upon addition of the MDI and was pressed into a cavity mold and cured for two hours at 125° C. The resulting product showed a tensile strength of about 467 p.s.i., 100% modulus, 133 p.s.i.; 200% modulus, 217 p.s.i.; 300% modulus, 300 p.s.i.; elongation, 439%, and Shore hardness 49.

EXAMPLE XIV

Table III reports the physical characteristics of a number of oil-extended polybutadiene urea-urethane resins. In each sample polybutadiene No. 45 was employed with 3,3′-dichlorobenzidene and a commercial toluene diisocyanate in the ratio of $NH_2/OH$ of about 1.0 and a ratio of $NCO/NH_2+OH$ of about 1.1. Dibutyl tin dilaurate, at a concentration of 0.5 part per hundred parts of total amine and polydiene, was used as a catalyst. The extender oil was the 200 SUS petroleum hydrocarbon rubber extender oil described in Example XI above and concentration of the oil, as well as of the carbon black is in terms of parts per hundred parts of polybutadiene intermediate polymer. All samples were cured for 2 hours at 100° C. followed by an additional 4 hours at 125° C.

TABLE III.—SAMPLE XIV

| | A | B | C | D | E | F | G | H | J | K | L | M | N | P | Q | R | S |
|---|---|---|---|---|---|---|---|---|---|---|---|---|---|---|---|---|---|
| Oil concentration | 0 | 10 | 20 | 30 | 40 | 50 | 0 | 0 | 10 | 10 | 30 | 40 | 50 | 50 | 50 | 50 | 50 |
| Carbon concentration | 0 | 0 | 0 | 0 | 0 | 0 | 10 | 20 | 20 | 20 | 20 | 20 | 10 | 20 | 30 | 40 | 50 |
| Pot life: | | | | | | | | | | | | | | | | | |
| Fluid, min | 1 | 1–2 | 2 | 3–4 | 5 | 7–9 | | | | | | 2 | 7–10 | 4 | 2 | | |
| Workable, min | 35–40 | 45–50 | 60 | 70–80 | 100 | 120 | 30–40 | 30 | 45 | 50–60 | 80–90 | 180 | 180 | 180 | 180 | 180 | 180 |
| Physical properties of cured elastomers: | | | | | | | | | | | | | | | | | |
| Tensile strength, p.s.i | 1,341 | 1,239 | 1,063 | 1,019 | 831 | 734 | 1,461 | 2,102 | 1,925 | 1,715 | 1,364 | 1,134 | 823 | 831 | 1,190 | 1,390 | 1,056 |
| Percent ultimate elongation | 273 | 265 | 265 | 281 | 275 | 244 | 218 | 320 | 306 | 371 | 301 | 270 | 283 | 215 | 251 | 271 | 170 |
| 100% modulus | 848 | 795 | 656 | 614 | 493 | 467 | 1,037 | 1,585 | 1,000 | 862 | 706 | 647 | 469 | 554 | 685 | 767 | 794 |
| 200% modulus | 1,158 | 1,087 | 931 | 840 | 708 | 672 | 1,427 | 2,058 | 1,475 | 1,264 | 1,077 | 965 | 683 | 828 | 1,055 | 1,187 | |
| Graves tear strength, p.s.i | 313 | 292 | 184 | 203 | 163 | 119 | 245 | 340 | 313 | 278 | 200 | 160 | 148 | 130 | 182 | 200 | 231 |
| Shore "A" hardness | 86 | 83 | 79 | 76 | 73 | 71 | 90 | 90 | 87 | 80 | 80 | 81 | 67 | 72 | 79 | 81 | 81 |

Similar urea-urethane-polybutadiene formulas were found to be extendable with other oils and with silica and other and/or inert fillers, while still retaining good elastomeric properties. As shown in Table III, the addition of oil diluent greatly increased pot life and greatly aided in the production of materials by liquid castable techniques.

So called "two-step" urethane elastomers can be made using the hydroxyl-containing polybutadiene homopolymers and copolymers described above. These elastomers are also oil extendable. As mentioned above, these are prepared adding an excess of tolylene diisocyanate (or other diisocyanate) to the hydroxyl-terminated polybutadiene homopolymer or copolymer to form an isocyanate terminated prepolymer. Or, mixtures of hydroxyl-terminated butadiene homopolymers and copolymers and polyethers (such as poly[oxypropylene] glycol or polytetramethylene glycol) can be made and the mixture reacted with an excess of tolylene diisocyanate or other conventional isocyanate. Similarly, mixtures of hydroxyl-terminated polybutadiene homopolymers and copolymers with hydroxyl-terminated polyesters can be converted to isocyanate terminated prepolymers by reaction with excess isocyanate as demonstrated in the following examples. The two-step urethane elastomers of the present invention may also be made from the pure isocyanate terminated prepolymer of the aforementioned materials which are mixed prior to conversion to elastomeric materials. For example, mixtures of isocyanate terminated polybutadiene homopolymers and copolymers may be admixed with isocyanate terminated polyethers and polyesters (and extender oil as well) followed by subsequent reaction to afford the so called "two-step" urethane elastomer.

EXAMPLE XV

A variety of isocyanate-terminated prepolymers were prepared from hydroxyl-terminated homopolymers and copolymers of butadiene. Typical, was the preparation of the following. 100 parts of a polybutadiene-styrene copolymer No. 15 were degassed at 110–120° C. in vacuo to remove traces of moisture or undesired low boiling materials. The polymer was then cooled to room temperature and 32.9 parts of tolylene diisocyanate added rapidly to the stirred mixture using a vapor by-pass dropping funnel. A 30° C. exotherm occurred within 30 minutes after addition of the diisocyanate and the batch required external cooling. The mixture was stirred for at least one hour after the TDI was added and permitted to stand at room temperature for 24 hours. The free —NCO content of the isocyanate terminated prepolymers was then determined using a standard dibutylamine titration procedure. Theory: 9.00% free —NCO. Found: 9.33%. This intermediate polymer was reacted with 1,4-butanediol at 80° C. using 0.20 part of dibutyltindilaurate catalyst per hundred parts of hydroxyl. The glycol was used in a ratio sufficient to supply a ratio of 1.10 isocyanate groups to hydroxyl groups. The cured polymer had an average tensile strength of 1301 p.s.i., an average tear strength (Graves) of 167 p.l.i., an average ultimate elongation of 244%, a Shore hardness of 73 on the "A" scale, an average 100% modulus of 650 p.s.i. and an average 200% modulus of 1129 p.s.i.

In like manner, high and low-viscosity hydroxyl-containing butadiene homopolymers and butadiene-acrylonitrile copolymers were reacted with amounts of TDI varying from 21.8 to 34.3 parts per 100 parts hydroxyl polymer to produce intermediate polymers which in turn are reacted with 2-ethylhexanediol-1,3; 2-methyl-2-ethyl-1,3-propanediol; phenyl-1,2-ethanediol; 1,4-butanediol; 3-chloro-1,2-propanediol; thiodiethylene glycol; 1,4-cyclohexane dimethanol; neopentyl glycol; glycol dimercaptoacetate; and polypropylene glycol. All of these "two-step" urethane polymers were oil-extendable, with rubber extender oils or with xylene-formaldehyde resins, polybutenes and the like. For example, many of the elastomers described were diluted with 50% or more of extender oil and still showed very good physical properties. As the degree of oil-extension increased, the elastomers became softer. Carbon black was highly effective in reinforcing the oil-extended gumstocks and, in fact, highly diluted gumstocks could be filled with from 1–50% or more of carbon black to afford very low cost elastomers. Usually, to achieve reasonably good properties in the oil extended gumstocks from 10–30 percent extender oil was employed and from 10–30% carbon black filler was employed. Many of the oil extended carbon black reinforced elastomers showed properties superior to or equivalent to elastomers which were not oil extended.

It was quite apparent that the oil extension of the isocyanate terminated prepolymers greatly facilitated the blending in of carbon black or other fillers and in fact, the oil extended materials showed much improved water resistance over non-extended urethane elastomers.

EXAMPLE XVI

A series of oil-extended urea-urethane elastomers was made from isocyanate-terminated prepolymers prepared by reacting an excess of tolylene diisocyanate with a hydroxyl-terminated polybutadiene liquid resin, as described above. The elastomers were prepared similarly to the following example. Into a resin kettle was placed 5250 grams (1.1 eq.) of an isocyanate-terminated polybutadiene prepolymer having a free —NCO content of 8.8% (as determined by butyl amine titration). The material was degassed at 60–80° C. and 50 mm. for one hour. The mixture was cooled to room temperature and 167.2 grams of N,N'-bis (1,4-dimethylpentyl) phenylene diamine was added and the mixture poured into a mold and allowed to stand at room temperature for about 24 hours and then cured for 2 hours at 75° C. The cured specimen showed a tensile strength of 2522 p.s.i.

This polymer and similar urea-urethane polymers made from various isocyanate-terminated polybutadiene homopolymers and copolymers were readily oil-extendible holding up to 50 percent oil while still retaining good physical properties. Carbon black and silica reinforcement were effective in enhancing the hardness and increasing the tensile properties of the highly oil-diluted systems. The DHN oils and other hydrocarbon oils were very compatible with the two-step urea-urethanes made from the isocyanate terminated polybutadiene homopolymer and styrene-butadiene copolymer. It should be emphasized that the two-step urea-urethane systems are very difficult to handle without oil dilution, since the reaction with the diamine occurs extremely rapidly, thereby limiting the workable pot life of the system. With oil dilution pot life can be greatly extended so that diamines which are ordinarily too reactive to be employed can be used successfully. For example, diamines such as methylene-bis(2-chloroaniline) (MOCA) is almost impossible to use with isocyanate terminated polybutadiene homopolymers and copolymers without oil dilution, but can be employed with oil dilution because of the increase in liquid pot life and decrease in viscosity of material during working.

EXAMPLE XVII

A urethane was prepared from hydroxyl-containing polybutadiene homopolymer and tolylene diisocyanate as described in Example IA by reacting 94.5 parts of polybutadiene homopolymer No. 45 and 5.5 parts of tolylene diisocyanate, which was cured at room temperature for one week.

(XVIIA) Twenty-five grams of the urethane was placed on a roller mill at 120° C., along with a like quantity of ethylene-propylene-terpolymer (Naugatuck Chem. Co.). The materials were co-milled for several minutes. At the end of this time the mixture appeared to be homogeneous. To the mix on the roller mill was added one gram of sulfur, 2.5 grams of zinc oxide, 1 gram of stearic acid and 1 gm. of tetramethyl thiuram disulfide. Milling was continued for about 15 minutes and the rolled sheet was cured in a molding press at about 150° C. at several hundred pounds pressure. As far as could be determined, co-vulcanization had taken place to give elastomeric materials containing urethane as well as ethylene-propylene rubber characteristics. Various DHN oils, in various quantities were employed to dilute the polybutadiene homopolymer prior to milling. These systems could also be filled with carbon black, silica and other fillers to enhance the physical properties.

(XVIIB) The above run was repeated except that the polybutadiene-urethane elastomer was co-milled with natural rubber and Hycar nitrile rubber. The Hycar and natural rubber blends with the polybutadiene-urethane rubber were translucent after milling and oil extension.

EXAMPLE XVIII

A urethane elastomer was prepared by reacting 30 grams of polypropylene glycol (1010 molecular weight) 14 grams of hydroxyl-terminated polybutadiene homopolymer and 6.3 grams of tolylene diisocyanate. The mixture was cured at 65° C. for 64 hours to afford a light-colored gumstock which was admixed with natural rubber on a rubber mill, in equal weights, to afford a compatible gumstock, which was oil extendible, sulfur curable, and readily reinforced by carbon black.

EXAMPLE XIX

The run of Example XVIII was repeated using a urethane system prepared from 90 parts of polybutadiene homopolymer and 10 parts of polypropylene glycol (2025 molecular weight) and 7.2 parts of tolylene diisocyanate. The mixture was cured at 65° C. for 64 hours. The resulting urethane gumstock (derived from a mixture of polybutadiene and polypropylene glycol) was milled with natural rubber in equal quantities to produce a soft gumstock which was sulfur curable, oil-extendible and readily reinforced by carbon black.

EXAMPLE XX (XXA) 200 grams of polybutadiene homopolymer No. 45 were mixed with 60 grams Paroil 142 and 22.2 grams of dichlorobenzidine. The mixture was degassed in a vacuum at 120° C. and cooled to room temperature. 33.6 grams of tolylene diisocyanate, 1.11 grams of dibutyl tin dilaurate and 2 grams of an anti-oxidant were added and the mixture stirred and poured into a mold. The mixture was cured for 2 hours at 100° F. and then for 4 hours at 125° F. and allowed to age at room temperature for 10 days. The properties of this finished elastomer were: Shore "A" hardness, 72; tensile (p.s.i.), 853; tear (p.i.), 184; percent elongation, 263; modulus, 100%, 505; and modulus, 200%, 743.

(XXB) A sample was prepared as in XXA but including also 20 grams of carbon black. It had the following properties: Shore "A" hardness, 78; tensile (p.s.i.), 1429; tear (p.i.), 193; percent elongation, 722; modulus, 100%, 722; and modulus, 200%, 1071.

EXAMPLE XXI

Hydroxyl-terminated polyisoprene was prepared by reacting 100 parts of isoprene, 70 parts isopropanol, and 10 parts of 50% hydrogen peroxide at 118° C. for 2 hours in an aluminum-clad autoclave. After the reaction was complete, the product was stripped in vacuo to afford a 55% conversion to hydroxyl-terminated polyisoprene showing a hydroxyl value of 0.92 meq./gm. Brookfield viscosity of about 40 poise at 30° C., and about 2.2 predominantly primary, terminal, allylic hydroxyl groups per average molecule.

A mixture of 100 grams of this hydroxyl-terminated polyisoprene, 50 grams of DHN 200 oil, 0.5 gram of dibutyl tin dilaurate and 8 grams of tolylene-diisocyanate (TDI) were mixed in vacuo and cast into molds. The molded specimens were cured at ambient temperature for about 48 hours. The product was a light colored material showing good elastomeric properties, particularly at low temperatures.

EXAMPLE XXII

A hydroxyl-terminated copolymer of isoprene of acrylonitrile was prepared by reacting 100 parts of a mixture of 85% isoprene and 15% acrylonitrile, 70 parts isopropanol, and 12 parts of 50% hydrogen peroxide at 118° C. for 1½ hours. A 60% conversion to copolymer was obtained, after stripping off the solvent and unreacted monomers in vacuo. The product had a hydroxyl content of 0.75 meq./gm. and a Brookfield viscosity of 1200 poise at 30° C. The acrylonitrile content was 14.7%, based on nitrogen analysis. This intermediate polymer had about 2.5 predominantly primary, terminal, allylic hydroxyl groups per average molecule.

A mixture of 100 grams of the above copolymer, 50 grams of DHN 200 and 6.5 grams of tolylene diisocyanate and 0.2 gram of dibutyl tin dilaurate is made and tre product cast into molds and cured at ambient temperature. A tough, oil resistant, elastomeric material is obtained.

EXAMPLE XXIII

A hydroxyl-terminated copolymer of butadiene was prepared by reacting 95 parts of butadiene, 5 parts of 2-ethylhexyl acrylate, 70 parts isopropanol, and 6 parts of 50% hydrogen peroxide at 130° C. for 2 hours. After stripping in vacuum the recovered polymer had a hydroxyl value of 0.70 meq./gm., and a viscosity of 64 poise. The conversion was 61 percent. Analysis of the polymer by saponification number showed a value of 16.3, indicating the presence of 5% 2-ethylhexyl acrylate in the copolymer. This copolymer had an average of about 2.2 predominantly primary, terminal allylic hydroxyl groups per molecule.

30 grams of the above copolymer, 30 grams of DHN 200 oil, 0.1 gm. of dibutyl tin dilaurate and 2.1 grams of tolylene diisocyanate were mixed at ambient temperature and poured into a mold. The mixture was cured at ambient temperature to afford a very resilient, soft elastomer.

EXAMPLE XXIV 100 parts of hydroxyl-terminated polybutadiene No. 45 was mixed with 100 parts of petroleum asphalt vacuum still bottoms. This asphalt, which had a softening point of about 225° F., and the diene polymer were mixed at 50° C. and 7.7 parts tolylene diisocyanate and 0.2 part dibutyl tin dilaurate catalyst were added. The ingredients were thoroughly mixed and cast into molds, which were allowed to cure at ambient temperature overnight. The specimens, after curing, showed good elastomeric properties and had higher tensile properties than gumstocks which were not extended with asphalt. These compositions are very useful as caulking compounds for concrete, glass, wood and various metal substrates. In particular, the low temperature properties of the asphalt were improved and the adhesion was improved.

EXAMPLE XXV 100 grams of butadiene-styrene copolymer No. 15, 9.2 grams of 3,3'-dichlorobenzidine and 100 grams Pontrar asphalt were mixed at 50° C. and 15.4 grams TDI and 0.2 gram dibutyl tin dilaurate catalyst were added with good mixing. The mixture was poured into molds and permitted to cure at ambient temperature overnight. The resulting product was a tough elastomeric material, which was useful as a caulk, sealant, adhesive, etc.

It is claimed:

1. An oil-extended, solid urethane elastomer comprising a urethane of polyisocyanate and an intermediate polyhydroxy polymer, and about 1–500 percent of an essentially hydrocarbon extender agent containing at least about 50 weight percent carbon and hydrogen and having a viscosity SUS at 100° F. of at least about 30, said intermediate polymer having an average of at least 2.1 predominantly primary, allylic, terminal hydroxyl groups per molecule and being an addition polymer of 0–75% by weight of an alpha-mono-olefinic monomer of 2 to 12 carbon atoms, and about 25 to 100% of a 1,3-diene hydrocarbon of 4 to about 12 carbon atoms, said intermediate polymer having a viscosity at 30° C. of about 5–20,000 poises, greater than about 50% of its unsaturation in the main hydrocarbon chain and a number average molecular weight of about 400 to 25,000, said solid elastomer being formed in the presence of said extender agent.

2. The elastomer of claim 1 in which the diene is butadiene.

3. The elastomer of claim 1 in which the diene is isoprene.

4. The elastomer of claim 1 in which the alpha-mono-olefinic residue content is about 10 to 40% by weight.

5. The elastomer of claim 1 in which the first intermediate polymer has about 40–70% trans-1,4-unsaturation and about 10–30% cis-1,4-unsaturation.

6. The elastomer of claim 5 in which the diene polymer has about 50–65% trans-1,4-unsaturation and about 15–25% cis-1,4-unsaturation.

7. The elastomer of claim 1 in which the intermediate polymer has a Brookfield viscosity of about 20 to 500 poises at 30° C.

8. The elastomer of claim 1 containing about 10–30% of the essentially hydrocarbon extender.

9. The elastomer of claim 1 containing about 1–50% carbon black.

10. The elastomer of claim 9 containing about 10–30% carbon black.

11. The elastomer of claim 1 in which the urethane includes urea-urethane polymers.

12. The elastomer of claim 1 in which the hydrocarbon extender is a mineral oil having a viscosity of about 100 to 600 SSU at 100° F.

13. A solid diene-urethane rubber comprising a urethane of diisocyanate and diene polymer having an average of 2.1 to 2.6 predominantly primary, allylic, terminal hydroxyl groups per molecule, said diene polymer being an addition polymer of 0–75% by weight of an alpha-mono-olefinic monomer of 3 to 12 carbon atoms, and as the essential balance a 1,3-diene hydrocarbon of 4 to about 12 carbon atoms, said diene polymer having a viscosity at 30° C. of about 5–20,000 poises, a number average molecular weight of about 400 to 25,000 and the major amount of its unsaturation in the main hydrocarbon chain, said rubber containing about 1 to 500% of an essentially hydrocarbon oil having a viscosity SUS at 100° F. of at least about 30.

14. The diene-urethane rubber of claim 13 in which the hydrocarbon extender is a mineral oil having a viscosity of about 100 to 600 SSU at 100° F.

15. The elastomer of claim 1 in which said intermediate polyhydroxy polymer has an average of 2.1 to 3 predominantly primary, allylic, terminal hydroxyl groups per molecule.

16. The elastomer of claim 15 in which is included about 5 to 100% based on the intermediate polyhydroxy polymer, of solid reinforcing filler.

17. The elastomer of claim 15 in which the amount of extender agent is about 5 to 150%.

18. The elastomer of claim 17 in which is included about 5 to 100% based on the intermediate polyhydroxy polymer, of solid reinforcing filler.

19. The elastomer of claim 18 in which the extender agent is a mineral oil.

20. The elastomer of claim 19 in which the urethane includes urea-urethane polymers.

21. The elastomer of claim 2 in which the alpha-mono-olefinic monomer is styrene in an amount of about 10 to 40% by weight.

22. The elastomer of claim 2 in which the alpha-mono-olefinic monomer is acrylonitrile in an amount of about 10 to 40%.

23. The elastomer of claim 14 in which the amount of hydrocarbon oil is about 5 to 150%.

References Cited

UNITED STATES PATENTS

| | | | |
|---|---|---|---|
| 3,055,952 | 9/1962 | Goldberg | 260—77.5 CR |
| 3,338,861 | 8/1967 | Mastin | 260—33.6 UB |

FOREIGN PATENTS 957,788    5/1964    Great Britain.

MORRIS LIEBMAN, Primary Examiner

P. R. MICHL, Assistant Examiner

U.S. Cl. X.R.

260—33.6 UB, 37 N, 77.5 AP, 77.5 CR